UNITED STATES PATENT OFFICE.

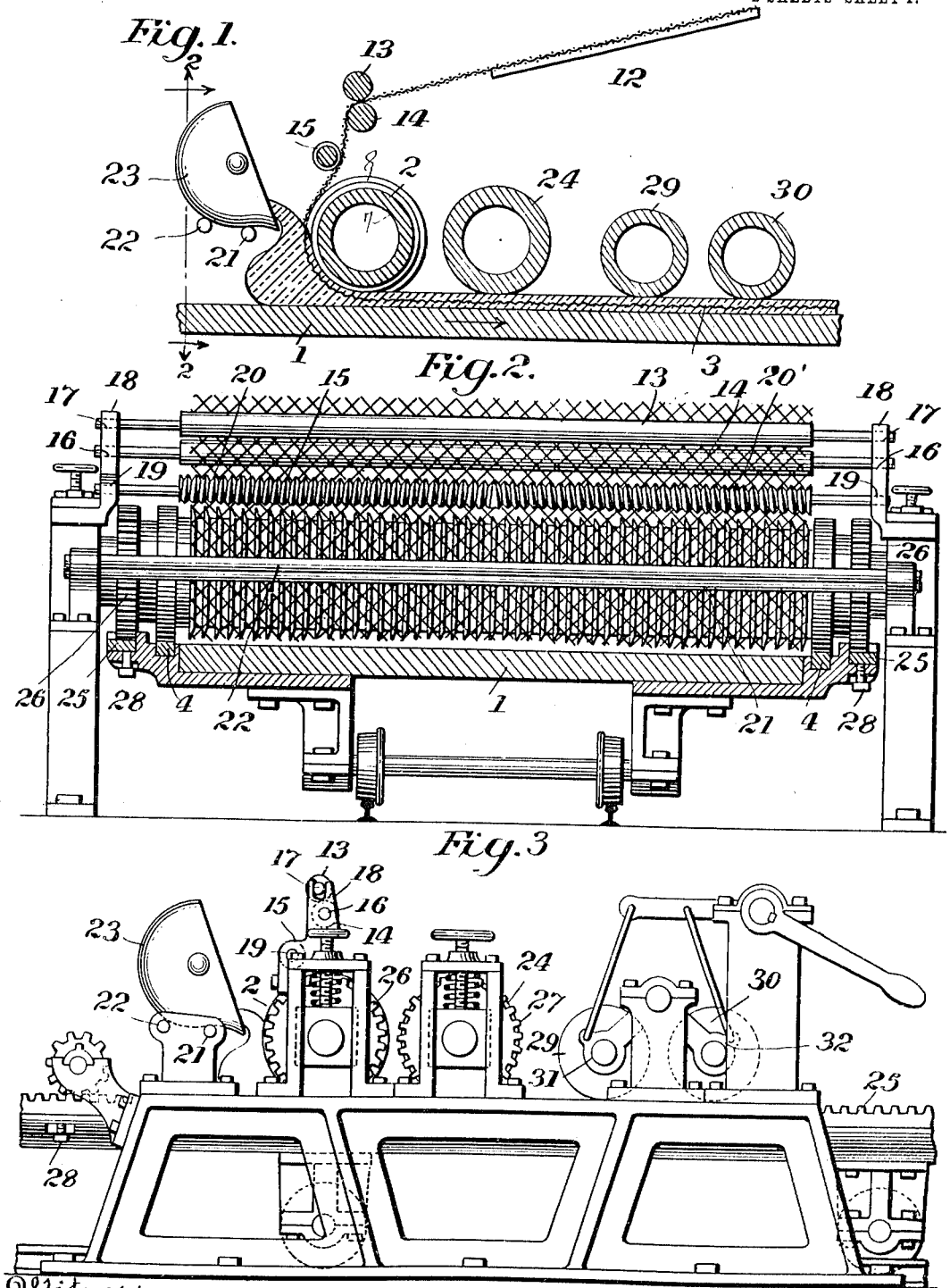

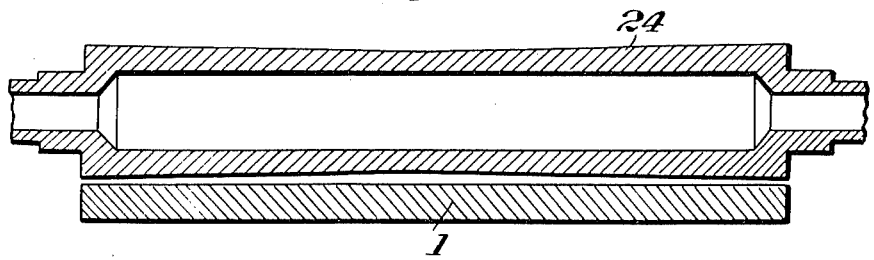
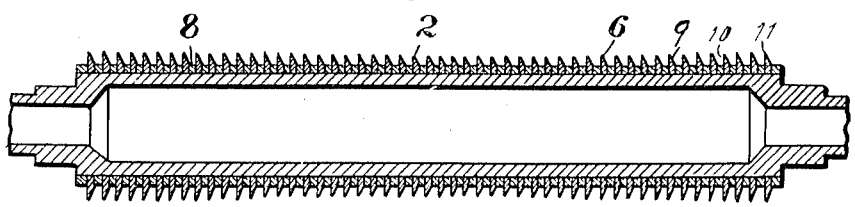
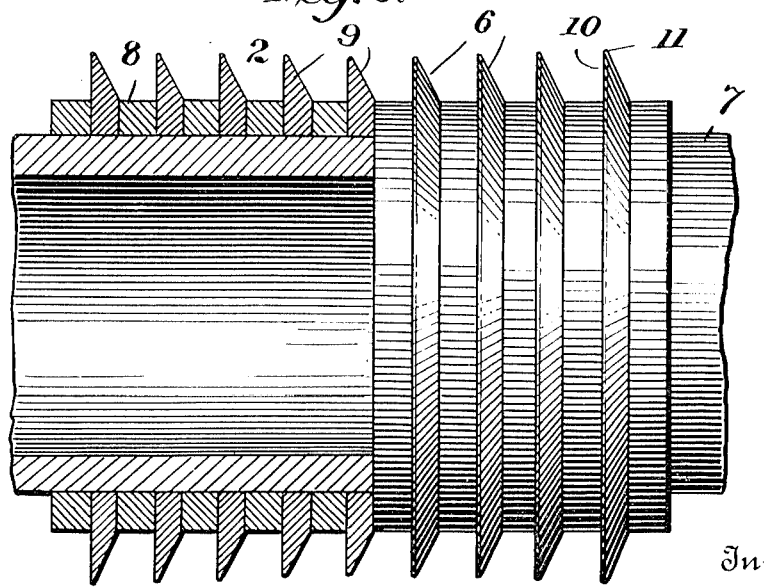

CLEMENT J. JUNGERS, OF STREATOR, ILLINOIS.

APPARATUS FOR MAKING WIRE-GLASS.

1,064,146. Specification of Letters Patent. Patented June 10, 1913.

Original application filed May 27, 1909, Serial No. 498,647. Divided and this application filed September 24, 1909. Serial No. 519,406.

*To all whom it may concern:*

Be it known that I, CLEMENT J. JUNGERS, a citizen of the United States, residing at Streator, in the county of Lasalle and State of Illinois, have invented a certain new and Improved Apparatus for Making Wire-Glass, of which the following is a specification, this application being filed as a division of a previously filed application on which Patent No. 938,385 was issued October 26, 1909.

This invention relates to an improved apparatus for making wire glass, and it has for its salient objects to provide an apparatus by the use of which sheets of glass may be formed of very perfect uniformity of thickness throughout, despite the distorting action of the heat of the glass being acted upon; to provide an apparatus adapted for making wire glass, so constructed and organized that the insetting or embedding of the wire will be accomplished without contaminating the sheet of glass, and especially without introducing air or gas which remains in the glass and forms bubbles; to provide an apparatus so organized and constructed as to provide a most efficient control and guidance of the wire netting during its introduction to the sheet of glass, whereby the netting is placed in a very accurately disposed undeviating plane; to provide an apparatus by means of which the wire is inserted through one side of a layer of glass with a minimum disturbance and distortion of the glass, thus minimizing the internal stresses remaining in the glass as a result of the insetting operation; to provide an apparatus by means of which the wire is not only efficiently inset but the cuts formed as an incident of the insertion are subsequently smoothed out and substantially obliterated in such manner as to produce a brilliant and extremely smooth and even surface upon this side of the sheet; to provide an apparatus in which a main smoothing roll operating to chiefly restore the integrity of the partially divided sheet is followed by one or more riding finishing rollers which complete the smoothing operation and leave the glass both uniform and brilliant; to provide an apparatus in which the flanges of the insetting roller are given a peculiar shape in cross section which facilitates the self-healing of the cuts formed by said flanges; to provide an apparatus in which the insetting flanges are of varying diameter and arranged in such manner as to insure the insertion of the sheet of netting to a uniform depth; to provide an apparatus which may be readily adjusted or modified to make relatively thin plate wire glass, such as is used without polishing, or the thicker grades, which are intended for polishing; to provide an apparatus so organized and constructed as to facilitate the uniform pouring of the molten glass across the full width of the bed; and, in general, to provide an improved apparatus of the character referred to.

The invention consists in the matters hereinafter described and more particularly pointed out in the appended claims.

The invention will be readily understood from the following description, reference being had to the accompanying drawings forming a part thereof, and in which is illustrated suitable and novel apparatus for carrying out the process.

In said drawings: Figure 1 is a longitudinal vertical sectional view of the casting bed, the forming rolls and feeding devices of an apparatus adapted to carry out the invention; Fig. 2 is a cross-sectional view on line 2—2 of Fig. 1 looking in the direction of the arrows, the pot, however, being removed; Fig. 3 is a side elevation of the parts shown in Fig. 1; Fig. 4 is an axial sectional view of one of the forming rolls and a cross-sectional view of the casting bed beneath the roll, intended to show the relation between these two parts and the concavity of the roll exaggerated; Fig. 5 is an axial sectional view of the embedding roll; Fig. 6 is a detail, partly in axial section and partly in side elevation, of the roll shown in Fig. 5, but on a larger scale.

The apparatus of my present invention is intended chiefly for use in carrying out a process of making single-pour, *i. e.*, single layer, wire glass, as distinguished from the so-called "sandwich" glass in which the sheet is composed of two layers, and, in a general way, the apparatus of this invention resembles that shown and described in the Shuman Patent No. 483,021.

It is well understood in this art that wire glass made in accordance with any of the single-pour or solid layer processes heretofore known has not been suitable for polishing. Among the difficulties which have prevented the successful making of polishable and other high grades of wire glass by the single-pour processes are the following: the distortion of the wire mesh and uneven placing of it in the finished product; the scarring of the surface during the introduction of the wire and failure of the following or finishing roll to eliminate these scars; the abnormal chilling and hardening of the surface of the glass, rendering it very difficult, if not impossible, to cut; the roughness or unevenness due to uneven placing of the wire, appearing upon the surface of the glass, this defect being so pronounced that the glass, as stated in said patent above referred to, has become known as "caramel glass;" the presence of a serious amount of bubbles in the finished product; the presence of streaks visible in the body of the glass in the finished product; the limitation as to the size of sheets which it was practicable to make under the old single-pour processes; the presence of small cracks, crizzles, or fire checks in the bottom surface of the glass; and an undulatory or uneven placing of the wire mesh in the finished product, leaving parts of the wire so close to one surface or the other that polishing was impracticable.

I have discovered that there have been at least two distinct and important reasons for the defective character of the so-called single-pour process glass heretofore produced. In the first place the wire mesh which is employed is a comparatively loosely woven fabric, woven in different widths and so used for the different widths of glass. The fabric has considerable elasticity and inevitably stretches under the action of embedding it in the glass, but the edges of the fabric are decidedly less elastic than the central portions. Heretofore in the carrying out of the single-pour processes there has been no proper or sufficient control of the feeding in of the wire netting, and as a result the wire netting has not been, even initially, placed in a substantially undeviating plane at a uniform depth from the surface of the glass. Secondly, it has always been believed essential to follow the embedding roller with a smoothing roller arranged to re-roll the sheet of glass with a view of closing and smoothing out the openings or cuts formed by the embedding flanges and by the meshes of the wire. Such re-rolling is not in itself necessarily an improper step, though I have discovered that it may sometimes be dispensed with, but as heretofore performed it has been so carried out as to make the production of good wire glass impossible. That is to say, I have discovered how to subject the sheet of glass after the wire has been inset to a rolling-pressing step without harmful effect upon the sheet; whereas, as will hereinafter be more fully pointed out, this smoothing step has heretofore been so performed that it practically re-formed the sheet, and in so doing displaced and usually more or less distorted the netting. By the use of the apparatus herein described these difficulties are obviated.

Referring now to the drawings, 1 designates a casting bed or table, which is preferably water cooled, and which bed may be either stationary, with the roll or rolls arranged to traverse the bed, or itself arranged to travel beneath the rolls; the rolls being held in suitable stationary supports and bearings. In the preferred embodiment the rolls are stationary, i. e., they have no bodily movement of translation, while the bed reciprocates.

2 designates the combined spreading and embedding roll, which is supported at such height above the bed of the table as to spread the glass out into a sheet 3 of substantially the same thickness it will have as a finished product. Said roll 2 is shown as arranged to travel on trangs 4 and is thereby supported above the table at a distance slightly greater than the thickness of the finished sheet.

As shown more particularly in Figs. 5 and 6, the roll 2 is provided with circumferential embedding flanges, the embedding flanges of the preferred construction shown being formed as disks 6, which are detachably mounted upon an internal roll body or core 7 and spaced apart at regular distances by means of removable collars 8, the outer peripheral surfaces of which constitute spreading surfaces which form the top surface of the sheet. These disks 6 and the spacing collars 8 are either formed of some dense fine-grained metal, such as steel or fine iron, or else, if formed of coarser metal, may be plated with nickel or other suitable metal, which will afford a smooth, dense, surface upon the acting edges of the disks, and preferably also upon the spreading surfaces of the roller. Furthermore, in the most efficient construction shown, the edges of these disks are beveled practically all at one side, as indicated at 9, while the opposed side 10 of each disk is perpendicular to the axis of the roll; the edge proper 11 being moderately sharp but still sufficiently rounded so as not to dent or disfigure the wire mesh. If the embedding or insetting of the wire be performed by the leading or spreading roll, it is essential that the radial depth of these flanges be determined by and made to conform to the thickness of the glass which is to be rolled. In other words, each different thickness of glass requires a different radial flange depth. Furthermore, it is important that these flanges be properly spaced apart, so that there is on the one hand ample space between the flanges to permit the glass to fully enter and pass through the spaces without any substantial tendency to cling to the rear side of the roller as the latter revolves, or to accumulate and push ahead of the roll. On the other hand, the flanges must be spaced sufficiently close to insert the wire without leaving it in undulations. So far as the action of the flanges upon the glass is concerned, the thinner they are the better, provided they do not cut or indent the wire, but, on the other hand, it must be taken into account that the flanges must have substantial thickness or mass in order that they shall not become overheated during their progress through the glass, because whenever the metal becomes overheated the glass sticks to it, and this results in the sheet being drawn up wave fashion in rear of the embedding roll. I have found in practice that flanges of one-eighth inch thickness at the base give good results and I prefer to space them about one-half inch apart for thin glass, and about double this distance apart for half inch or heavy glass.

The importance of using embedding flanges having suitable dense and smooth surfaces is a matter which has heretofore not been appreciated or understood. I have discovered that the streaks defining the paths of the embedding flanges in the finished glass are usually entirely due to the use of improper flanges. Of course, if the flanges are not kept scrupulously clean they will produce streaks regardless of their quality. But, assuming the embedding flanges to be clean, still in the art as heretofore practised the paths of the flanges have been clearly visible in the finished glass and this has been due to the fact that the pores of the metal held occluded gas which was deposited or left in the molten glass and expanded into minute bubbles, many of which are microscopically small, producing milk-like streaks, in which there may usually be discerned bubbles of larger size. I have demonstrated, however, that if a very dense smooth metal be used for these embedding flanges, or for surfacing the same, then this difficulty is wholly eliminated.

An important and essential feature of the invention resides in maintaining a reliable and controlled feeding-in of the wire mesh. As shown more clearly in the drawing, the wire mesh 9' is fed in in advance of the embedding roll, and I have found that it is important that the wire be kept in close, firm contact with the edges of the embedding flanges from a point where the wire encounters the ball or pour of glass, around to the point where the flanges leave it properly placed. To secure this maintained and close contact with the flanges the wire must be kept under accurate control and not allowed to descend loosely. Furthermore, it is important that the wire be kept laterally spread out in a straight line across its full width, and preferably kept taut under more or less tension. To accomplish this control of the wire, I have devised special feeding devices which I will now describe. The wire is arranged to pass from any suitable source of supply, as, for example, from a table-like chute 12, whereon it is initially laid in suitable lengths, to and through a pair of tension rollers 13, 14, thence past and in peripheral contact with a stretching-out roll 15 of special construction which operates to distend the wire laterally with a gentle or slight but continuous tension, and thence beneath the main roll. The tension rolls 13 and 14 may have smooth, cylindric, peripheries, and they are journaled parallel with each other; the lower roll being mounted in substantially fixed lower journals 16 and the upper roll having its trunnions 17 confined in forks 18 which are of such depth as to let the periphery of the roll ride with its full weight upon the lower roll. It follows that when the wire is passed between these rolls the weight of the upper one produces a tension upon the wire, and this tension (which need not be great) may be increased if desired by placing added weights or springs upon the extended trunnions of the upper roll.

The stretching roll is journaled in fixed journals, as indicated at 19, and its periphery is formed into two oppositely pitched prominent screw-threaded or spirally corrugated portions, as 20, 20', each of which covers half the length of the roll, so that the two meet at the center of the latter. The wire in being drawn past this stretching roll rotates the latter, and the direction of pitch of the two threaded portions is such as to effect a spreading action upon the wire and stretch it from edge to edge. It will be noted that the location of the spreading roll is such with reference to the front side of the main roll that the wire is held in contact with the latter to a point above that reached by the ball of glass. Furthermore, the lateral spreading tension will be to an extent controlled and effected by the longitudinal tension.

Another feature of the apparatus which contributes to the reliability and success thereof is the provision of means whereby the pouring or dumping of the glass upon the table may be gradual and continued throughout the chief part of the spreading operation, thereby enabling the ladleman to keep a relatively small but sufficient quantity of glass in front of the roll at all times during the forming of the sheet. For this purpose a pair of supporting bars 21, 22, are mounted parallel with, and in advance of, the main roll in such position that they together form a cradle-like support upon which the ladle 23 may be rested and slid back and forth while pouring. The use of this kind of a support with a ladle enables the workman to continue the pouring as long as desired, and to distribute the pour very evenly across the entire width necessary to form the sheet; this being accomplished by sliding the ladle back and forth while in its pouring position. There are several advantages inherent to this way of pouring, among which may be mentioned that the wire mesh passes through the glass for a comparatively short distance only before it is permanently placed in position; the pour of glass encounters but a relatively small portion of the periphery of the roll, and is therefore less rapidly cooled and, what is perhaps more important, is tumbled or rolled less during the spreading operation; the pour may be larger than could be well accommodated by dumping the entire ladleful at once; the leading roll is not in contact with so large a mass of molten glass at any time and consequently is not heated to the same degree, and the workman is able to perform his work of pouring much more accurately and easily than is the case where the ladle is supported during the emptying of the same by sheer strength.

I have discovered that one of the most important reasons for failing to successfully make high quality wire glass in accordance with the prior art single-pour processes was due to the use of such methods and apparatus as resulted in re-rolling and partly redistributing the constituent parts of the sheet, after it had been first spread. A prime reason for failure of success heretofore has been, I think, due to the failure to take into account the fact that as soon as the pour of glass is dumped upon the table, and especially when it has been spread out across the table, the casting bed expands as to its upper surface under the action of the heat and assumes a distinctly crowning shape in transverse section. This crowning commences as soon as the glass is dumped but increases materially during the progress of the formation of the sheet. If, as has heretofore been customary, a straight cylindric roll be used to roll out and smooth the sheet it will, of course, be obvious that the sheet will be made thinner at the middle than at the edges thereof to the extent that the periphery of the roll and the bed of the table have been thrown out of parallelism by the expansive effect described. Inasmuch as the spreading roll passes over the bed of the table as fast as the ball of glass is spread, and is usually started very promptly after the pour has commenced, it follows that the crowning of the table beneath this roll is less than is the case with any roll or rolls which traverse the sheet after it has been spread. It is, however, appreciable even under the spreading roll, and if glass is to be made of uniform thickness from edge to edge it is necessary that the roll be correspondingly concave. Accordingly I prefer to make the combined spreading and embedding roll concave both as to its main body between the flanges and as to the edges of the flanges themselves. In practice I have found from three to five thirty-seconds of an inch smaller diameter at the center of the roll than at the acting ends thereof to be suitable.

When I use a smoothing roll, as, for example, as indicated at 24 in the drawings, this roll is made in conformity with the usual practice, except that it is made concave in axial section to an extent sufficient to compensate for the crowning of the table under the action of the spread-out sheet of glass. In practice I have found that from four thirty-seconds to six thirty-seconds of an inch smaller diameter at the center than at either end is suitable; assuming that the machine is of a size for making sheets of glass up to fifty inches in width. The smoothing roll 24 is mounted upon trangs or collars, the same as the leading roll, and it is important that its periphery be supported at a distance from the bed of the table almost or just equal to the mean thickness of the sheet of glass, so that it will press the surface of the glass and uniform the same without substantially disturbing the preformed mass of the sheet. Moreover, it is important that both the spreading and embedding operation, and the subsequent rolling-pressing operation (if the latter be employed) be performed in such manner as to avoid to the greatest practical extent any drawing, pulling or pushing effect upon the surface of the sheet. This means that the peripheral speed of these rollers must be adjusted with considerable nicety. If either of these rolls has a peripheral speed greater than the speed at which the bed is passing beneath it, relatively speaking, then the roll tends to draw through the roll-pass two much glass, thus producing a surplus of glass and wave-like effect in rear of the roll, while on the contrary, if the roll be rotating at a peripheral speed which is too slow as compared with the onward movement of the table, it will produce a dragging effect upon the surface of the sheet, which will not only make the latter uneven, but, if severe enough, will show its effect in transverse cracks through the "skin" of the top surface. Moreover, the effects of improper peripheral speed in the case of the embedding roll, in addition to a tendency to displace the glass, also tends to buckle the wire netting in case the roll is rotated too fast, or to distort the meshes, softened by the heat of the glass, and stretch them out in case the roll is rotated too slowly. To obviate these objections I provide racks 25 along each side of the bed, and upon each of the several rolls provide gears fixed upon the rolls and which intermesh with these racks.

In the drawings, 26 and 27 designate the gears of the leading and smoothing roll, respectively. I prefer to provide a series of gears, graded in size for each of the several rolls, substituting one pair for another in adjusting each roll until I get the correct peripheral speed. The means of adjusting the rack vertically, shown in the present instance, comprises tap bolts 28 threaded vertically through the bed frame and engaging the under sides of the racks.

To impart a still greater degree of smoothness to the glass, I sometimes employ one or more relatively light riding or floating rolls, as 29 and 30; these rolls being supported in journal forks or slots 31 and 32, in such manner that the weight of the rolls rests wholly upon the surface of the glass. The peripheries of these rolls are made concave to a degree accurately conforming to the concavity of the smoothing roll 24, so that the weight of the rolls will be distributed with approximate uniformity throughout the full width of the sheet. These rolls need not be controlled as to their peripheral speed, since the sheet has sufficient firmness to rotate them without distorting the surface.

The operation of the apparatus has been largely indicated in connection with the foregoing description, but may be briefly recapitulated as follows: A sheet of wire netting having been properly adjusted in the feeding apparatus and carried down in front of the leading roll, a pour of glass is dumped in front of said roll and the table started. As the table travels beneath the rolls, the leading roll spreads and forms a sheet, the flanges at the same time forcing the wire into the sheet to a depth approximately one-half its thickness. The wire netting as it is fed through the tension rolls is held taut longitudinally and is thus drawn into firm bearing with the spirally corrugated stretching-out roll, which revolving under the action of the netting drawn past it, produces a stretching-out action upon the wire, thus holding it taut laterally. Obviously, this holding of the netting taut both laterally and longitudinally is a material factor in insuring that the wire shall enter the sheet of glass and be placed therein in a substantially undeviating plane, uniformly distant from the surface through which it is inserted.

The pour of glass dumped upon the table causes the latter to expand as to its upper surface and the table becomes crowning or surface as to its heated portion. This convexity is compensated for by the concavity of the leading roll and variation in diameter of the embedding flanges. As the glass is spread out and progresses relatively along the table, the crowning effect likewise progresses. The spread sheet with the netting embedded therein emerges behind the leading roll and passes under the smoothing roller, the concavity of which compensates for the convexity of the table, and therefore the surface of this smoothing roller acts uniformly across the full width of the sheet, and if properly adjusted closes and nearly obliterates the cuts produced by the flanges and by the meshes of the wire. Care must be exercised in adjusting the smoothing roll so that its periphery is spaced above the table a distance which very closely approximates the mean thickness of the sheet of glass, since if the smoothing roll be set closer to the table accumulation of glass in front of this roll and a respreading action is inevitable, while, on the other hand, if the roll be too high, the smoothing-out action will not be as complete as it should be.

In case it be desired to produce glass having an almost perfectly smooth and uniform surface I employ the riding rolls described and these follow the smoothing roll. These riding rolls are of such convexity that they accurately conform to the surface of the sheet of glass as it leaves the smoothing roll and the glass has now become sufficiently cooled to momentarily support each riding finishing roller and to yield under the latter only so much as will result in smoothing out the remaining unevenness.

By the use of this apparatus I am able to produce a quality of glass which is second to none heretofore made by the best "sandwich" processes.

I am entirely familiar with the patent to Ryon, No. 531,570, and also with the apparatus as practically constructed and operated under that patent, but they in no sense anticipate the features herein contained, or any of them. The embedding flanges or disks of said Ryon apparatus were made relatively thick and blunt at their edges to avoid or minimize bending of the netting which was fed in without maintained control. Moreover, they were formed of ordinary cast iron, neither dense nor smooth, and in use produced the bubble streaks which I obviate.

I claim:—

1. In a wire glass rolling apparatus, the combination of a casting bed, means for spreading a sheet of glass and introducing a sheet of metallic netting thereto, and a roll coöperating with said bed to roll-press the glass after the wire has been introduced, one of said latter elements being made normally concave as to its sheet-forming surface to compensate for the expansion of the metal under the action of the hot glass and to effectively roll-press the surface of the sheet throughout its full width without effecting a redistribution of the mass of the body of the sheet.

2. In a wire glass-rolling apparatus, the combination with a casting table, of a combined sheet-spreading and embedding roll, provided with circumferential parallel flanges of succeeding smaller diameter from each end of the roll toward the center thereof, so that the periphery of the roll, as defined by the peripheries of the flanges, is concave.

3. In a wire glass rolling apparatus, the combination with means for spreading and forming a sheet of glass and introducing a sheet of wire netting thereto, said means comprising an embedding roll provided with embedding flanges, the peripheries of which define a cylinder slightly concave in axial section, of a coöperating smoothing roll, having a similarly concaved periphery.

4. In a wire glass rolling apparatus, the combination with a casting table and means for spreading and forming a sheet of glass thereon and introducing a sheet of wire netting thereto, of an embedding roll provided with embedding flanges and having its periphery as defined by the peripheries of said flanges made slightly concave in axial section, a coöperating smoothing roll likewise having a concave periphery, and a riding roll having a concave periphery of substantially the same degree of concavity as that of said smoothing roll.

5. In a glass-rolling apparatus, the combination with a spreading roll and an opposed coöperating sheet-forming member, of a supporting frame extending alongside of but spaced away from the front of said forming roll and constituting a ladle-support upon which the ladle may be shifted back and forth while pouring.

6. In a glass-rolling apparatus, the combination with a spreading roll and an opposed coöperating sheet-forming member, of a supporting frame extending alongside of but spaced away from the front of said forming roll, consisting of a pair of parallel bars spaced apart and elevated above the roll-pass, and constituting a ladle-support upon which the ladle may be shifted back and forth while pouring.

7. In a wire glass rolling apparatus, the combination with the sheet-forming elements, of a wire-feeding apparatus comprising tension devices through which the web passes on its way to the roll-pass, and a stretching-out member interposed between the tension devices and roll-pass, said member having oppositely-pitched obliquely disposed sharp-ribbed surfaces at each side of its longitudinal center, across which the web of wire is drawn.

8. In a wire glass rolling apparatus, the combination with the sheet-forming elements, of a wire-feeding apparatus comprising tension devices through which the web passes on its way to the roll-pass, and a spreading roll interposed between the tension devices and roll-pass and with the periphery of which the web of wire contacts, said spreading roll having a two-part spirally ribbed surface, the ribs of opposite ends of the roll being of opposite pitch.

9. In a wire glass rolling apparatus, an embedding roll provided with embedding flanges of wedge-shaped form in radial section, one side of the flange being substantially perpendicular to the periphery of the roll and the opposite side having all of the inclination which forms the bevel.

10. In a wire glass rolling apparatus, an embedding roll provided with embedding flanges of wedge-shaped form in radial section, one side of the flange being substantially perpendicular to the periphery of the roll and the opposite side having all of the inclination which forms the bevel, the acting surfaces of said flanges being of metal practically non-absorbent of free air and smooth surfaced.

CLEMENT J. JUNGERS.

Witnesses:
 ALBERT H. GRAVES,
 E. H. PARKINS.